(12) United States Patent
Romaen et al.

(10) Patent No.: US 10,255,024 B2
(45) Date of Patent: Apr. 9, 2019

(54) METHOD AND SYSTEM FOR DISPLAYING A SEQUENCE OF IMAGES

(71) Applicant: Roryco N.V., Edegem (BE)

(72) Inventors: Hans Romaen, Edegem (BE); Peter Ryckaert, Edegem (BE)

(73) Assignee: Roryco N.V., Edegem (BE)

( * ) Notice: Subject to any disclaimer, the term of this patent is extended or adjusted under 35 U.S.C. 154(b) by 0 days.

(21) Appl. No.: 15/524,041

(22) PCT Filed: Nov. 25, 2015

(86) PCT No.: PCT/EP2015/025089
§ 371 (c)(1),
(2) Date: May 3, 2017

(87) PCT Pub. No.: WO2016/082939
PCT Pub. Date: Jun. 2, 2016

(65) Prior Publication Data
US 2017/0322764 A1      Nov. 9, 2017

(30) Foreign Application Priority Data

Nov. 26, 2014   (BE) .................... 2014/0792

(51) Int. Cl.
*H04L 12/18*      (2006.01)
*G06F 3/14*       (2006.01)
(Continued)

(52) U.S. Cl.
CPC ............. *G06F 3/1454* (2013.01); *G09G 5/14* (2013.01); *H04L 51/10* (2013.01); *H04N 7/20* (2013.01);
(Continued)

(58) Field of Classification Search
CPC ............. H04L 12/1822; H04L 12/1827; H04L 12/189; H04L 12/2801; H04L 29/12066;
(Continued)

(56) References Cited

U.S. PATENT DOCUMENTS

2006/0233191 A1*  10/2006  Pirzada .............. H04N 21/4126
                                                                    370/463
2008/0201751 A1*  8/2008   Ahmed .............. H04N 21/4312
                                                                    725/109
(Continued)

FOREIGN PATENT DOCUMENTS

CN      202838720 U     3/2013
WO      2014/057465 A1  4/2014

OTHER PUBLICATIONS

Belgian Search Report and Written Opinion, dated Jul. 14, 2015, from Belgian Application No. 2014-00792, filed Nov. 26, 2014. Five pages.
(Continued)

*Primary Examiner* — Michael J Eurice
(74) *Attorney, Agent, or Firm* — HoustonHogle LLP

(57) ABSTRACT

The invention relates to a system and method for displaying and transmitting a sequence of images to listeners. The method comprises the following steps: transferring a sequence of images displayed to a transmitting device; transmitting by the transmitting device the images displayed in real time over a multicast wireless communication network, preferably WI-FI; receiving and displaying the images transmitted by a receiving device of the listener; optionally processing and/or annotating the images received by the listener on his device. The invention also relates to a system for the implementation of this method.

13 Claims, 4 Drawing Sheets

(51) Int. Cl.
*H04N 7/20* (2006.01)
*H04L 12/58* (2006.01)
*G09G 5/14* (2006.01)
*G06F 3/0482* (2013.01)
*G06F 17/24* (2006.01)
*H04W 84/12* (2009.01)

(52) U.S. Cl.
CPC .......... *G06F 3/0482* (2013.01); *G06F 17/241* (2013.01); *G09G 2354/00* (2013.01); *G09G 2370/16* (2013.01); *H04L 12/1827* (2013.01); *H04W 84/12* (2013.01)

(58) Field of Classification Search
CPC ............. H04L 29/06027; H04L 67/306; H04L 67/34; H04L 67/04; H04L 67/42; H04L 69/08; H04L 69/169; H04L 2012/2841; H04L 47/2416; H04L 63/10; H04L 63/12; H04L 63/0428; H04L 63/0471; H04L 63/08; H04L 63/083; H04L 63/0861; H04L 65/1006; H04L 65/65; H04L 65/4007; H04L 65/4015; H04L 65/403; H04L 65/4076; H04L 65/60; H04L 65/605; H04L 65/607; H04L 65/608; H04N 21/222; H04N 21/25816; H04N 21/4122; H04N 21/4325; H04N 21/43615; H04N 21/43635; H04N 21/43637; H04N 21/41407; H04N 21/4183; H04N 21/44004; H04N 21/4363; H04N 21/4402; H04N 21/4405; H04N 21/441; H04N 21/4415; H04N 21/482; H04N 21/6405; H04W 4/00; H04W 12/02; H04W 12/06; H04W 12/08; H04W 76/15; H04W 84/12; G06F 3/1454; G06F 3/0482; G06F 9/542; G06F 13/10; G06F 17/241; G06F 21/606; G09G 5/14; G09G 2354/00; G09G 2370/16

See application file for complete search history.

(56) References Cited

U.S. PATENT DOCUMENTS

| | | | | |
|---|---|---|---|---|
| 2009/0093688 | A1* | 4/2009 | Mathur | A61B 5/411 600/300 |
| 2010/0095337 | A1* | 4/2010 | Dua | H04L 29/06027 725/110 |
| 2010/0231790 | A1* | 9/2010 | Ansari | G06Q 30/04 348/552 |
| 2011/0105226 | A1* | 5/2011 | Perlman | A63F 13/12 463/30 |
| 2012/0084838 | A1* | 4/2012 | Inforzato | G06F 21/575 726/4 |
| 2012/0297090 | A1 | 11/2012 | Manges | |
| 2013/0094423 | A1* | 4/2013 | Wengrovitz | H04L 12/1836 370/312 |
| 2013/0346564 | A1* | 12/2013 | Warrick | H04L 41/0816 709/219 |
| 2014/0214916 | A1* | 7/2014 | Gokul | G06Q 30/02 709/201 |
| 2014/0259074 | A1* | 9/2014 | Ansari | H04N 21/482 725/50 |
| 2014/0287685 | A1* | 9/2014 | Griffin | H04W 12/02 455/41.2 |
| 2014/0297799 | A1* | 10/2014 | Gordon | A63F 13/338 709/217 |
| 2015/0121466 | A1* | 4/2015 | Brands | H04L 63/08 726/4 |
| 2016/0014172 | A1* | 1/2016 | Van De Laar | H04L 65/403 709/229 |
| 2016/0014457 | A1* | 1/2016 | Dua | H04L 29/06027 725/25 |
| 2016/0078582 | A1* | 3/2016 | Bhathena | G06T 1/0007 715/738 |
| 2016/0134929 | A1* | 5/2016 | Robii | H04N 21/462 725/81 |
| 2016/0236083 | A1* | 8/2016 | Perlman | H04N 21/2343 |

OTHER PUBLICATIONS

International Search Report and Written Opinion of the International Searching Authority, dated Feb. 8, 2016, from International Application No. PCT/EP2015/025089, filed Nov. 25, 2015. Ten pages.

International Preliminary Report on Patentability, dated Jun. 8, 2017, from International Application No. PCT/EP2015/025089 filed Nov. 25, 2015. Seven pages.

* cited by examiner

METHOD AND SYSTEM FOR DISPLAYING A SEQUENCE OF IMAGES

RELATED APPLICATIONS

This application is a § 371 National Phase Application of International Application No. PCT/EP2015/025089, filed on Nov. 25, 2015, which claims priority to Belgian Application No. BE 2014/0792, filed on Nov. 26, 2014, both of which are incorporated herein by reference in their entirety.

FIELD OF THE INVENTION

The present invention relates to a method and a system for displaying images. More in particular, the invention relates to a method and a system for a presentation to an audience, for example to a group of listeners in a classical business or private meeting, or in the context of a congress or a seminar. Such presentation includes displaying by a presenter or otherwise, a sequence of images on a display, e.g. on a screen so positioned that it can be viewed by all or the majority of the listeners, to listeners, whereby the sequence of these images (image data) is transmitted simultaneously wirelessly to the listeners.

In an alternate embodiment of the invention, no image is displayed by the presenter on a central screen, but the images are directly displayed on the individual screens of tablets, portable computers or other display devices held by the listeners.

BACKGROUND OF THE INVENTION

It is known that during meetings on congresses, seminars, product presentations and similar events, presentations are held by a presenter to an audience of listeners who are present in a common room. The listeners watch the presentations of images displayed by the presenter and listen to his verbal explanation.

It is also known that thanks to state-of-the-art technology, for example guides use their smart tablets to show photo's and plans or enlargements of the details of pieces of art. However, in such a case, these images can only be viewed by a few number of persons from the audience, given the size of the screen.

By the present invention all listeners of an audience will be able to view the images simultaneously on their own tablet. There are a large number of different applications in various sectors (building & construction, learning, exploration in nature, . . . )

In a number of situations the images are put at the disposal of the members of the audience participating in the event after the presentation, for example by means of a Power-Point presentation.

This may be achieved by printing out the images and providing each listener a hand-out in printed form, or—as is more often the case—by submitting the images in electronic form, for instance stored on a memory stick as for example a USB-stick or to be downloaded by means of a web link, that enables access—either or not through a secured password—to a website of an organization of the presentation, where the data of the presentation, including the images displayed, are stored.

However, as will be explained in greater detail later on, such method only enables the distribution of static info, that is information that has been gathered prior to the presentation or meeting.

Information that is generated during the meeting itself or info that has been collected shortly before the meeting but that could not be included in the presentation due to time constraints, consequently cannot be distributed to the targeted audience of listeners.

The method as described above however is rather cumbersome and quite inefficient. The distribution of the presentations in paper format has the disadvantage that—apart from the cost of printing and distributing the documents—the listeners generally receive a pile of paper that is difficult to store and to consult. In a number of instances the content of the presentation, including the sequence of images of the presentation, is provided to the listeners beforehand. This simplifies the annotation by the listeners, but reduces the news-content at the very moment of the presentation itself, as all of the information has already been handed out to the audience. On top hereof, it reduces the value of the story to be told by the presenter.

Submitting the presentation in digital form after the event itself has taken place prevents the above mentioned problems, but has other disadvantages.

The main drawback is that the listener only receives the information after the event took place. Also in such a case, there is a disconnection between the notes the listener may have taken and the information that he may have access to electronically but after the event took place. On top hereof the amount of information that he receives afterwards may be larger than the info the listener wishes to keep, namely a subset of the full slide deck that relates to information that is of real interest to him. Further we note that quite a lot of information is put at the disposal only a few days (or even weeks) later, resulting in a quite reduced relevancy for the audience.

We further note that quite often listeners in the audience during a presentation stand upright and take photo's of the images projected on the large screen. In this way the listener gets quickly an image of the information presented. However by such action, the listener disturbs the presentation and reduces the comfort of the other persons in the audience.

These drawbacks are quite noticeable, as they prevent that the intrinsic value and attractiveness of a presentation, given in a theater hall of listeners on a congress or seminar, are used at full.

Therefore, there remains a need for a method and a system whereby the benefits of the inherent power and effects of a presentation to an audience can be fully explored.

SUMMARY OF THE INVENTION

The aim of the present invention is to offer a solution to the abovementioned and other drawbacks, by offering an efficient method and system for transmitting a sequence of images (image-data), and optionally also audio-data, between a presenter and listeners during the presentation.

To this end, the invention relates to a system for displaying a sequence of images by a presenter to listeners, comprising the following means:

(a) a presenting device (1) suitable for displaying images out of a sequence of images by a presenter to listeners and for transferring same to a transmitting device (2);

(b) a transmitting device (2) suitable for receiving, storing and transmitting the sequence of images displayed and transferred to it;

(c) a receiving device (4) suitable for receiving, storing and displaying the images transmitted on a screen to the listener; characterized in that
(i) the transmitting device (2) is suitable to transmit the sequence of images transferred from the presenting device (1) in real time by means of a wireless multicast network, whereby upon transmittal of the last image displayed, the sequence of the previously displayed images is re-transmitted;
(ii) the receiving device (4) comprises software loaded as an application from the internet or from the transmitting device (2), enabling the listener to select one or more images from the sequence of images transmitted and for storage and annotation of the selected images.

To this end, the invention also relates to a method, comprising the following steps:
(a) displaying by a presenter images out of a sequence of images and simultaneously transferring the images displayed by means of a presenting device (1) to a transmitting device (2);
(b) transmitting by the transmitting device (2) of the images displayed through a wireless network;
(c) receiving of the images transmitted by the transmitting device (2) and displaying same on receiving devices (4) of the listeners;
characterized in that
(i) the sequence of images is transmitted by the transmitting device (2) in real time through a wireless multicast network, whereby upon transmittal of the last image displayed, the sequence of the previously displayed images is re-transmitted;
(ii) one or more images from the sequence of images transmitted is selected by the listener for storage on the receiving device (4) and for processing and annotation by means of software loaded on the receiving device (4) as an application from the internet or from the transmitting device (2).

Optionally, the method comprises each or any of the following additional steps:
d) annotating by the listener of the data received on his receiving device (4);
e) transmitting by the listener of the image data selected, either with or without annotations, to a cloud environment (5);
f) transmitting by the listener of the image data to a cloud-server (5) and annotating same on the cloud-server;
g) analysing by the presenter of the data transmitted to the cloud-server.

According to a preferred embodiment of the invention, also voice or audio data can be added to the image data, whereby the term image data comprises as well still data as moving data (video content).

According to a preferred embodiment of the invention, the receiving device (4) of the listener is a mobile data processing apparatus, for example a laptop, a tablet, a smartphone, in short any electronic device capable of receiving and displaying the sequence of images transmitted by the transmitting device.

According to a further preferred embodiment of the invention, the distribution of the sequence of image data occurs by means of a wireless network and by various means depending on the number of listeners to be reached, in most cases in multicast mode, this means simultaneously to various listeners.

As a wireless network, use can be made for example of a WI-FI certified data network, operating according to the international IEEE 802.11 (wireless Ethernet or Wi-Fi) network standard.

The wireless network operates in real time.

By the term 'real time' or 'in real time' or abbreviated 'RTC' (Real Time Communication) in the context of the present invention should be understood a characteristic of the data transmission or speed of a wireless communication network whereby the image on the receiving device of the listener is available for being viewed instantly, or nearly instantly when the same image is displayed by means of a projector on the large screen and transmitted wirelessly by the transmitting device. So Real Time Communication as used herein refers to any live communication that occur without transmission delays. RTC is nearly instant with minimal latency. The RTC data and corresponding messages transmitted by the transmitting device are not stored between transmission and reception.

Further use is being made of a wireless network that transmits in multicast mode.

The term multicast wireless network in the context of the present invention should be understood as a wireless network whereby the term "multicast" should be interpreted as meaning that the content is transmitted by the transmitting device and whereby the sender does not receive a message back from the receiver stating that the information transmitted is safely and well received. Differently phrased, anyone having the appropriate apparatus and authorisation and being located within the transmitting range of the transmitting device can pick up the information transmitted. This is a so-called one to many mode of information distribution.

According to a preferred embodiment, the term "multicast" comprises the situation whereby the transmitting device can communicate over the wireless network with the users, in this case the listeners, that have been previously registered or have been authenticated by means of their respective receiving devices on the multicast group for receipt of the data packages concerned.

In this case the communication comprises apart from the prior authentication, the sending of the image information by the transmitting device over the multicast wireless network.

One of the advantages of the system according to the invention is that no additional or supplemental software need to be loaded or installed on the display device of the presenter.

According to a preferred embodiment of the invention, for various apparatuses, optimized data streams are sent (for instance various resolutions).

According to a further preferred embodiment of the invention the data comprise a presentation in image format, and optionally also the pointer signal that indicates when the presenter switches to the next image within his presentation.

According to a further preferred embodiment of the invention the sequence of images comprises a continuous or discrete stream of images, for example a presentation in image format, for instance in a Power Point or pdf format, and optionally also an audio signal sent by the device of the presenter.

According to a further preferred embodiment, the presentation on the receiving device of the listener is displayed in three formats:
 i. a full screen mode, whereby the listener views the images in full format;

ii. a picture in picture mode or pip, whereby the listener wishes to annotate an image, or wishes to note markings;

iii. at a predefined area of the screen, for instance at the bottom, the full sequence or only a part of the sequence or "carrousel" of all already transmitted images are shown, whereby the listener can choose to go back and may select a previously transmitted image.

According to a further preferred embodiment the receiving device, after annotation or marking of an image by the listener, the listener may switch again to the full screen mode.

According to further preferred embodiment, the predefined area of the screen mentioned under iii above is used to show all snapshots already taken by the listener.

According to a further preferred embodiment, the system according to the present invention comprises the following: a platform for analysis for the presenters, whereby they can request info with respect to the actions that have been taken by the listeners regarding their presentations (for example what kind of information that has been stored).

A preferred embodiment of the system of the invention comprises encryption software for securing the data transmitted or broadcasted by the transmitting device to the receiving devices of the listeners.

The transmission and distribution of the image data presented earlier by the presenter takes place by means of a so-called carrousel, whereby the listener has the ability to switch between the presently transmitted image and a specific image selected out of the previously transmitted images (the so-called 'carrousel'), that either is displayed again, or is being annotated. The transmitting device thus transmits sequentially the last image displayed, followed by the sequence or carrousel of all previously displayed images.

In the system according to the invention, the 'classical' way of presentation (for example by means of a projector or beamer) can be kept. In that case in practice, a split is performed of the video/audio signal.

A further preferred embodiment of the system of the invention comprises authentication software enabling the listeners before receipt of the data displayed, to authenticate on the server of the transmitting device (2).

In the system according to the invention, the data transmitted to the listeners only comprise the data that already have been displayed by the presenter, so excluding the data that still need to be displayed by the presenter.

More in particular the invention comprises the methods and systems as described in the claims set forth hereinafter as well as in the following more detailed description of the invention.

SHORT DESCRIPTION OF THE FIGURES

So as to more clearly illustrate the features of the invention, hereinafter are set forth as an example without any limiting effect, some preferred embodiments of a method and a system according to the invention, with reference to the figures attached to the present specification.

In these drawings or figures, the following elements are shown:

Figure 3:
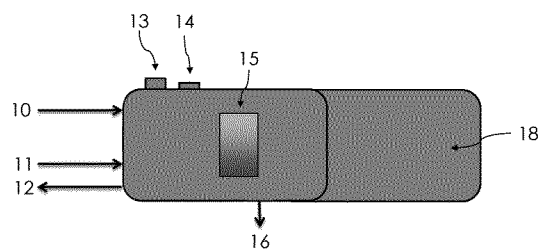

FIG. 3 also shows the transmitting device (2), including its WI-FI module.

Figure 4:

FIG. 4 shows the screen of a receiving device (4) of a listener during a presentation.

Figure 5:
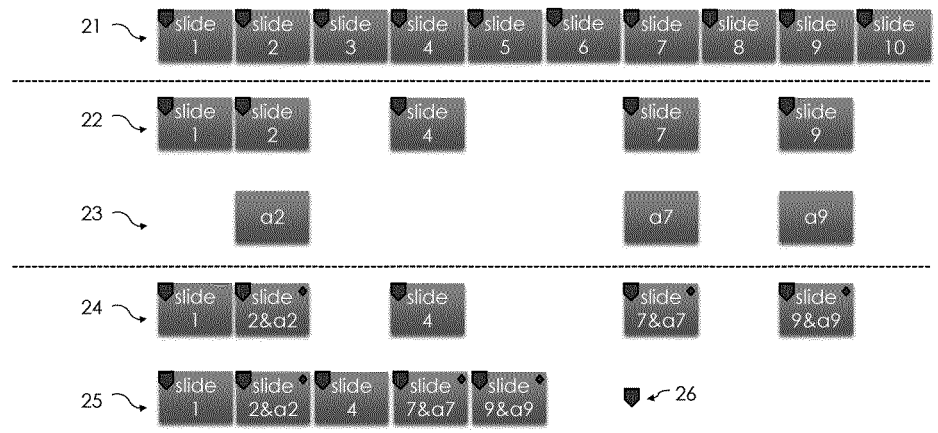

FIG. 5 shows an overview of the steps according to the method of the invention.

Figure 6:
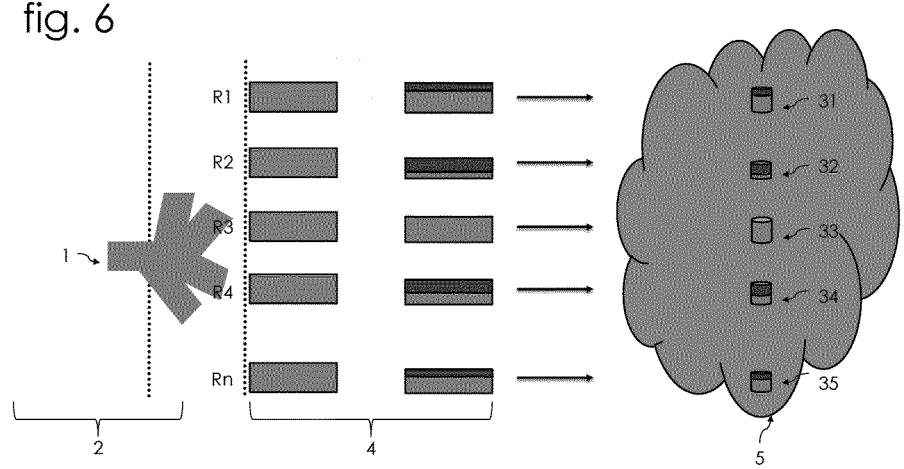

FIG. 6 shows the stream of information of the transmitting device (2) to the cloud (5).

Figure 7:
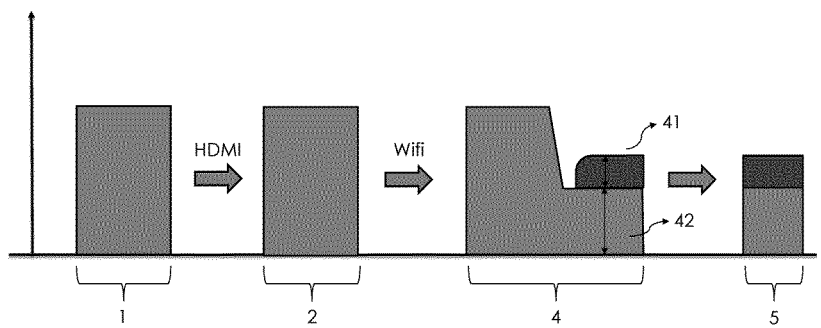

FIG. 7 shows the stream of information among the various devices.

Figure 8:
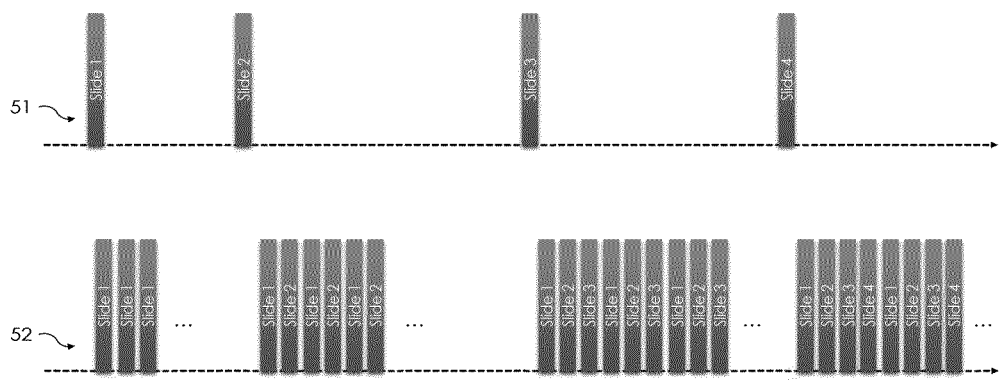

FIG. 8 shows the sequence and the build-up of the image data and—streams that are being transmitted or broadcasted by the transmitting device (2).

DESCRIPTION OF THE INVENTION

The invention consists of a method and a system that comprise the steps, respectfully the means above cited. Preferred embodiments of the invention are also set forth above. Hereinafter, the invention will be further described and explained with reference to the figures.

Various embodiments of the present invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. In addition, an aspect described in conjunction with a particular embodiment of the present invention is not necessarily limited to that embodiment and can be practiced in any other embodiment of the present invention.

Figure 1:
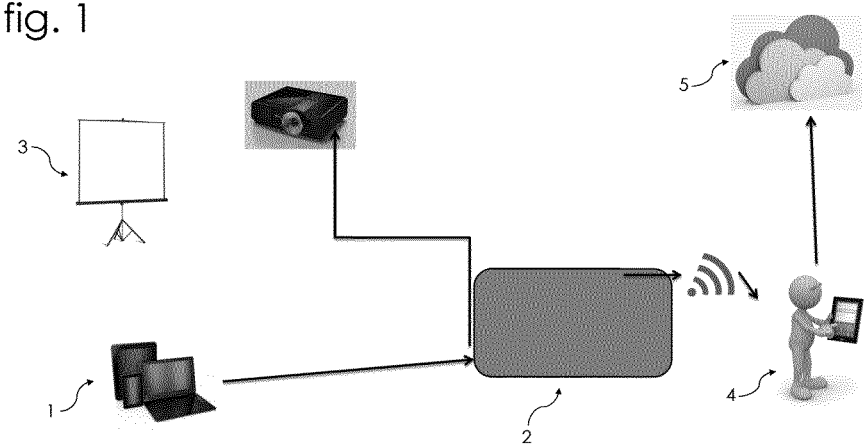
FIG. 1 shows a general view of the system according to the invention.
Figure 2:
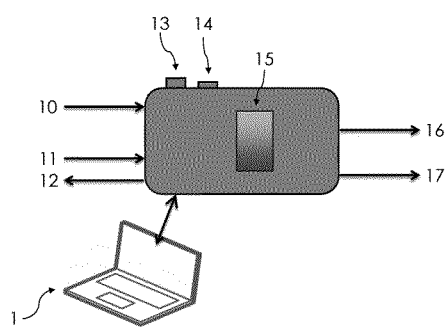
FIG. 2 shows the transmitting device (2) and its respective functionalities.

Hereinafter, the reference signs as used in these figures, and the respective parts and/or elements that they denote, are set forth:

FIG. 1: 1 presenting device; 2 transmitting device; 3 screen; 4 listener with a receiving device of a listener; 5 cloud FIG. 2: 1 presenting device; 10 power supply; 11 HDMI in; 12 HDMI out; 13 on/off button; 14 reset button; 15 LCD display; 16 (optional) connection to internet (fix or mobile); 17 (optional) connection to WIFI installation FIG. 3: 18 WIFI Module FIG. 5: 21 presenter info; 22 receiver selection; 23 annotation; 24 selection & annotation; 25 cloud space receiver; 26 individual information tag slide FIG. 6: 31, 32, 33, 34, 35: space receiver 1, 2, 3, 4 and n; R1, R2, R3, R4 and Rn: receiver number 1, 2, 3, 4 and n.

FIG. 8: Actions set out in function of time; 51,52 denote flow 1, resp. flow 2

FIG. 1:

This figure shows the system according to the invention, comprising the presenting device (1), the transmitting device (2) as well as the receiving device (4).

Also the position of these devices with respect to the presenter are shown. Also shown is the optional use of a large screen (3) (visible to all or the majority of the listeners), and the connection to the receiving devices (4) of the listeners. Also the connection of the receiving devices (4) of the listeners with the cloud (5) is shown.

This figure illustrates the various components of the presentation solution as offered by the present invention. On the display screen of the presenting device of the presenter, marked in the figure "presenting device (1), a presentation is shown. The (audio and/or video) images (image data, either still or moving, either accompanied or not with audio) of the presentation are forwarded in digital format for example by means of a HDMI (High-Definition Multimedia Interface) connection (or a variation hereof, if need be with extension parts) to a transmitting device (2). As an alternative embodiment, the images shown by the presenter may be directly transferred by the presenting device (1) to the transmitting device, without prior display to the listeners, e.g. on the central screen. The image-signal received by the transmitting device (2) from the presenting device (1) on the one hand is processed internally on such transmitting device. Further, according to a preferred embodiment, such signal on the other hand is transmitted via a loop through also in digital format, so for example via an HDMI output port, where it can be picked up by a projection device, for example an LCD-projector, for projection on a screen (3), visible for the listeners or the audience. No additional software needs to be loaded or installed on the presenting device (1) for the implementation of the method according to the invention.

The internal processing of the image signals is executed by the kernel of the transmitting device (2), whereupon the processed signal is offered as a signal, preferably as a multicast signal, to be sent over a wireless communication network, in particular a Wi-Fi-network to the receiving devices of the listeners (4).

To this end, an application (hereinafter in short designated as app), has been installed on the receiving device (4), of persons that are part of the audience. Such listener(s), who may view the images that are projected by the LCD projector on the large screen first, do receive on their receiving devices (4) the information that is transmitted or broadcasted by the transmitting device (2) by means of the Wi-Fi-network, preferably a multicast WIFI network, in the meeting room or theater hall. This app processes the information as received and displays same on the screen of the receiving device (4). On top hereof this app may be supplemented with various functionalities such as the possibility to select information and to annotate same, as well as the possibility to store same on the receiving device (4). Provided this receiving device (4) is connected to the internet, this information can also be stored in the 'cloud (5)'. On top hereof, the system and method of the present invention offer the facility to display again previously presented information.

The following describes various aspects of the invention:
the devices used in the method and system of the invention can vary in form and kind (various types, brands, operating systems, . . . )
the main advantage offered by the invention is:
  no need to install software on the presenting device (1) to transmit the images to the transmitting device (2);
  the images are processed and broadcasted by the transmitting device (2) in real-time for being displayed on the receiving device (4);
various preferred embodiments of the transmitting device (2) can be used for implementing the method according to the invention; this will be illustrated hereinafter, and such may include for example the use of internal or external antennas;
the transmitting device (2) may offer various additional options, such as multiple information streams depending on the resolution of the screens of the receiving devices (4), the use of a second broadcasted stream of information comprising all images up to the actually presented image; in either of these instances the quality of the transmission and/or the possibility to review previously presented images can be offered;
possibility for the listeners to have access to the public internet, . . . .

FIG. 2:
This figure shows the transmitting device (2), and its link (17) to a WI-FI-transmitting module. This figure shows the in- and output functions of the apparatus.
In this respect, we note the following elements:
  power supply (10): this can be either line current (AC power 130/220 V) or high-power USB;
  HDMI in (11) & out (12): the image information coming from the presenting device (1) and being forwarded to the (LCD-)projector for display on the screen (3);
  connection (17) with a WI-FI-module to distribute image information in real time and multicast.
Optionally connections may be provided with:
  an apparatus operated by an administrator of the event controlling or supervising the presentation given by the presenter; this administrator may be able to supplement the image information sent by the presenter with additional information, for example in respect of the event taking place;
  the public internet, by means of a fixed or mobile connection (16).
So as to show the status of the transmitting device, a number of LED (Light Emitting Diodes)'s or LCD (Liquid Crystal Displays) displays (15) may be provided on the device, as well as an on/off switch (13).
Also the transmitting device may be equipped with a reset button (14).

FIG. 3:
This figure shows the transmitting device (2), now including the WI-FI transmitting module. This figure shows the same elements, connection, parts and modules as shown in FIG. 2, but now including the WI-FI module (18) that is fully incorporated in the transmitting device (2).

According to a preferred embodiment of the transmitting device (2) as used in the present invention, such device may include, apart from the fully incorporated WI-FI module, also an on-board battery for mobile use.

Such on-board battery-module enables the device to be operated in a fully mobile way. The batteries may be loaded by means of the line current connection (10) (AC power and/or high power USB).

FIG. 4:
This figure shows the screen of the receiving device (4) of a listener, whereupon the software-application (app) according to the invention has been (down)loaded.
This figure illustrates the four parts shown on the screen when a listener is working with the app:
in the large area in the middle of the screen (workspace):
the image is shown that is ready for being annotated by the listener. This image can either be the actual image that is shown by the presenter, or one of the previously shown images selected by the listener out of the sequence or carrousel of images that are shown at the bottom of the screen;
on the area top left of the screen:
a window shows the image that is being displayed by the presenter (current slide). This is the image that is displayed at that very moment by the presenter on the display screen of his presenting device and (according to a preferred embodiment) via the (LCD) projector and the corresponding large screen to all potential receivers or listeners;
at the left side of this screen:
a space is reserved for information that additionally can be shown, such as "selection, storage and annotation";
at the bottom of this screen:
a strip is shown with the sequence or carrousel of images already stored, starting at the left side with the images that are presented earliest up to the right side, showing the more recently presented images. The images marked with a dot right above are images that have been annotated and/or selected for being stored.

FIG. 5:

This figure shows the mode of selecting images, performing annotations on same and storing of this information by the listener.

This figure shows stepwise the result of the actions that can be performed by the listener on the stream of information received, symbolized by 10 images.

On the first row (21):
are shown the 10 images received by the listener and that have been shown by the presenter. Based on this view, the presenter is then actually presenting image nr. 10. Each image comprises apart from the visual information also a tag (symbolized in the left top corner), that comprises event-, speaker-, as well as other information that has been added by the organizer of the event, and that can be used to identify the image, to store and retrieve same.

On the second row (22):
a selection can be seen of the images that have been marked as relevant by the listener and that have been selected on that criteria. For the given 10 images, this means that the images with number 3, 5, 6, 8 and 10 are not of interest to the listener.

On the third row (23):
the images are shown for which the listener performs an annotation.

For the given 10 images, this means that image number 1 and 4 are of interest to the listener but that no annotations are made on these images, and that annotations are indeed made for images number 2, 7 and 9.

On the fourth row (24):
is shown a combination of selected images with the annotations.

These are ticketed in the top right corner (see also previous figure).

On the fifth row (25):
the same information as in row number 4 is shown, ready for being stored in the private space in the cloud of the listener concerned, as soon as the opportunity occurs. When this is reviewed on the level of the images, it corresponds with a volume of information that on the one hand has been received by the receiving device (4) from the transmitting device (2) and a volume of information generated on the receiving device (4) comprising the selection of images and the annotations performed by the listener.

FIG. 6:

This figure shows the stream of information as from the transmitting device (2) till the space reserved in the cloud (5) for the listener and the operations that can be performed by the various listeners.

At the bottom of this figure, '2' refers to the functions performed by the transmitting device (2), '4' refers to the selection and annotation functions performed on the receiving device (4) whereupon the app is loaded, and '5' refers to the functions performed in the cloud (5).

The light grey areas above the numeral '4' indicate images selected by the listener on his receiving device, the dark grey areas indicate images that have been annotated on said device.

Reference numerals R1, R2, R3, R4 and Rn denote listener or receiver number 1, 2, 3, 4 and n that each receive information from the presenter device 1 over the transmitting device (2) and the WIFI network.

Reference numerals 31, 32, 33, 34, 35 denote the various spaces in the cloud reserved for storage of information for listeners, resp. receivers 1, 2, 3, 4 and n.

This figure further illustrates the possible operations that can be performed by a listener on the information received. From this figure it is clear that each individual listener can perform various actions (selection and annotation) and as a result obtains a specific set of information that on the level of the cloud space can be stored for the various listeners. In FIG. 6 the result of this storage in the cloud (5) is shown for a plurality of listeners.

Listeners may store images of presentations in the cloud, whether or not with annotations, in particular images of earlier presentations. These images are then available for later access by such listeners as well as other persons having received the required authorisation.

Apart from the above stream of information from the listeners to the cloud (5), there may also a derivative stream of information to the presenter, whether or not through the manager of the cloud storage space, who can consult various analyses regarding the use of his presentation(s).

FIG. 7:

FIG. 7 illustrates the stream of information from the presenting device (1) over the transmitting device (2) to the receiving device (4) and finally till the cloud space (5) of the listener and the various interactions between such devices.

The transmitting device (2) receives in digital format, for example through an HDMI-port, all information that is sent by the presenter through his presenting device (1) to the external projector, in real time. The transmitting device (2) on its turn sends all info through a multicast WI-FI network to the receiving device(s) (4) of the listener(s). The receiving device (4) with the app of the listener takes care of the receipt and enables the listener to select and whether or not to annotate the information deemed relevant by the listener. The combination of the selected information and the annotations form the volume of information that is stored locally, but that can also be sent through the public network and at a time to be determined by the listener to his/her private space in the cloud (5). In said cloud space (5), the listener has at his/her disposal information that can be further processed, including being included in a catalogue, sent to others, processed in different other applications, . . . and that can also be stored as archive.

This information in the cloud is also accessible by means of the more classical access methods for storage in the cloud.

Reference numeral 41 denotes annotation performed by the receiver, whilst reference numeral 42 denotes images selected by the receiver. Light grey zones on the figure indicated information presented by the presenter and dark grey zones indicate information added by the receiver in the form of annotation on the images selected.

So all in total, three different modules or parts are comprised within the system of the present invention, each performing some steps of the method according to the invention: the transmitting device (2) that through the HDMI-cable receives the information of the presenter (from the presenting device (1)) and hereupon prepares same for being sent through the WI-FI simultaneously and in real time to a multitude of receiving devices (4).

The app that has been installed by each listener on his/her receiving device (4), captures the information broadcasted, processes same and takes care of the presentation on the screen of the receiving device (4). The listener can perform actions such as annotations that lead to a new package of information, reference is hereby made to the previous figures.

The cloud (5) is the storage place where each listener has a private partition or part and where he may store his package of information. In this private part the information can be stored of the many events wherein the listener has participated by means of his receipt-app. Also at this location there are various actions the listener can perform.

The manager of the cloud space can perform analyses on the data stored in such cloud space, taking duly account of the privacy-legislation. Such actions include for example searching for info, sharing, sending, categorizing, deleting, extending info stored.

Further additional services may be performed such as administration, access authorization, analytics on the data stored, as well as various related additional services.

Functions on the receiving device may include for example capture of the image data, decryption of same, decoding same, presentation on its display screen, annotation, selection and various viewing functions, storing on the device, saving to the cloud, retrieving from the cloud.

Functions on the transmitting device may include for example capture of information received from the presenting device (1), encoding, encrypting, encapsulating and/or transmitting same.

FIG. 8:

FIG. 8 shows two streams of information that are being processed from the transmitting device (2) up to the receiving device (4) with loaded app.

The first stream (51) consists of images (slides 1, 2, 3, 4) that are displayed in real time by the presenter from his presenting device (1). Given that the display of images is characterized by the fact that during a large period of time no new information is displayed and/or transmitted, use is being made of this 'idle' period to realize a second stream of information (52) consisting of the sending of the ever increasing carrousel of images, from the very first image shown up to and including the most recent image shown by the presenter:

the first block comprising only slide 1, repeated all over again until . . .

the second block starts, comprising slides 1 & 2, repeated all over again, until . . .

the third block starts comprising slides 1, 2 & 3 repeated all over again, until . . .

the fourth block starts comprising slides 1, 2, 3 & 4 repeated all over again.

This mode of operation offers advantages for the receiving device (4) as images that could not or could only partially be received, can be received again. On top hereof the receiving device (4), when activated after the start of the presentation, is still able to capture all previously displayed images. In this way the carrousel shown at the bottom of the screen, reference being made to FIG. 4, can always be completed.

The term "tablet" as used in the present description relates to apparatus that visualize information to a user, and that enables a user to operate interactively by touching by hand or a stylus; this comprises tablet-computers strictly spoken such as an Apple iPad, an Acer Icona, a Samsung tablet, an Archos Arnova, but also smartphones or portables with a comparable functionality.

DETAILED DESCRIPTION OF THE INVENTION

The various steps of the method of the invention are as follows.

As a first step of the method according to the invention, data in the form of a video signal is available on the presenting device (1) of the presenter, and displayed on its screen. This presenting device (1) may be a PC, tablet or smartphone of the presenter and the info is made available through the physical port (video output signal), for example the VGA/DVI/HDMI or another port of a PC/tablet/smartphone.

These digital video data or signals are being delivered to the transmitting device (2) through a cable or wirelessly. If need be extension parts and/or adapters can be used to accommodate the variety of physical ports and data forms.

The signal as received may be encoded and/or encrypted, and is distributed by wireless broadcasting, in real time and preferably by WI-FI. Optionally the original signal is also sent to the usual receivers simultaneously (for example a beamer, LED display, . . . ).

These signals that have been encoded by the transmitting device (2) are subsequently received and decoded by the receiving device (4) of the listener.

To this end the receiving device (4) of the listener has downloaded an application from the website of the system through an internet connection or from the transmitting device (2). Hereinafter the receiving device (4) of the listener will be described in greater detail.

The encoded signal is captured by the receiving device (4), for example a tablet or smartphone (or another device that captures WI-FI signals and that can load an app and/or can upload the necessary software from a different source, for example the transmitting device (2)). By means of the app the signal so captured (the image or video, if need be supplemented by audio-info) is decoded and so transformed to an image on the receiver tablet/smartphone device (4). The receiving device (4) of the listener continues to receive the consecutive image data from the sequence of image data during the entire period that the presentation of the presenter goes on.

These image data can be shown on the screen of the receiving device (4) in three different formats:

As a full screen image, in case the listener wishes to simply view the image data;

As a partial "PIP=Picture In Picture" image at the moment the listener performs an action on one of the previous images, and until this action is finished. This action can be one of the following items, given as an example (these actions are put at the disposal by means of a row of virtual keys at one of the sides of the screen of the presenter):

making an annotation for an image;

marking text on the image.

The annotation and the marking are performed on a different layer. The user finishes his actions and stores the image+the second layer with annotations.

According to a preferred embodiment the images selected on the receiving device (4) of the listener and the annotations/markings can be stored in the space in the cloud at a time still to be determined.

After the storing or the termination of the actions, the receiving device (4) may be switched again to the images in "full screen" modus.

In a more advanced version, in case the listener believes he has missed something (a given image), then he can "rewind" to the earlier point in time where he believes he can review the missed image again, and he then reviews again the image concerned. In this operation the formats "full screen" and "PIP" can be used. To this end the carrousel of images that can be viewed at the bottom of the screen of the receiving device is useful (third format, similar to format 2 but more images arranged one above or near to the other).

According to a further embodiment of the invention, the receiving device (4) of the listener comprises a recording functionality. This can be performed for example by the instruction tag or icon marked 'record". With this feature the images sent out by the transmitting device (2) are stored on the receiving device (4) of the listener, with a start and stop function.

In the implementation of the present invention it is important that the listener is not able to view an image out of the sequence of image data that are to be shown by the presenter, except at the very moment when the presenter shows the image concerned on his screen, or on the large screen that is visible to all listeners of the audience.

Detailed Technical Description for the Implementation of the Invention:

Hereinafter are set forth the technical implementation details for the method and system according to the invention set forth supra.

The transmitting device (2) (and its CPU or built-in hard disk) must be able to timely and accurately detect, capture, decode, store and transmit the sequence of image-data transmitted by the presenter.

One needs to appropriately take into account the capacity on the receiving device (4) of the listeners, the switching between on-line following and capturing of the previous images, the annotations and markings and the recording of same.

From the storage means, for example the hard disk, the transmitting device (2) via a communication or transmitting means transmits the images in real-time and promptly hereupon sends out the sequence of previous images of the presentation so that listeners can view images that have been shown by the presenter previously.

The characteristics of the transmitting device (2) such as the storage and transmitting means need a priori to be defined in view of the anticipated size of the total presentation of the presenter or presentations of the presenters, and coupled hereto, the size and strength of the receiving devices (4).

The power of the WI-FI network and the multi-cast protocol (of other future protocols that enable one device to reach plural devices) determines in a first instance the geographic scope; the number of receiving devices (4) can then be calculated as a function of these parameters.

It is important that for the transmission to take place in real time, the images are shown without noticeable delay in time on the very same moment on the screen of the presenter, the large screen and the receiving devices (4) of the listeners.

The quality of the images and the diversity of image qualities of the screens of the presenters and listeners should be duly taken into account.

Advantages of the Method and the System of the Present Invention:

The method and the system according to the invention contribute in various embodiments to a more efficient way of presenting information and an enhance attractiveness of congresses, seminars and the like. It offers various advantages as well for the organizers, the presenters as well as for the listeners, participants in the event. Hereinafter are set forth some of the advantages that are put in practice by the invention: Flexibility/effectiveness/contribution to an improved communication as all participants have in real time the same information at their disposal and can supplement/comment and storage same as they deem appropriate (so no need for unnecessary storage/archival that is not consulted afterwards, keeping as a result the overhead costs limited).

Gain of efficiency in use of time and sustainability.

This way of working enables to prevent or at least suppress the 'inherent tendency to the use of a paper form to add some info", but still to keep the value of the info added. Nowadays it is no longer realistic to store a digital presentation (for example in pdf format) and at the same time at a different place the paper format (both of these formats are seldom used at the same time). On top hereof there is no longer a need still to store the full pdf of a presentation (after the event), as the pieces of information relevant to the listener already have been stored prior hereto. In practical circumstances the time or opportunity is no longer available after an event or training session to walk through the pdf of the presentation that is put at the disposal of the participants of the event and to delete whatever parts are of no interest to the participant.

One of these possibilities relates to the specific embodiment whereby no general (large) screen is used, but use is made only of screens for the individual listeners or participants to the event.

The screens of the individual listeners can be fully mobile, so powered by means of an on-board battery.

The presenting device that is used by the presenter for the display of the sequence of image data is described hereinafter.

The receiving device (4) that is used by the listeners to detect, store, display on a screen the sequence of image data transmitted by the transmitting device (2), is described hereinafter.

The wireless WI-FI communication network by means whereof the transmitting device sends the sequence of image data to the receiving devices of the listeners, is described hereinafter.

The presenting device (1) that fulfills the functions abovementioned, may consist for example of a sufficiently powerful personal computer (PC), capable of presenting any video output. This device preferably comprises input and output means such as a keyboard, a mouse, a screen and in- and outgoing communication channels, as well through wired connections as well as wireless. A desktop model as well as a laptop model may be used.

The presenting device (1) comprises an output port for delivering the video/audio signal to the transmitting device (2).

In general this presenting device is capable of delivering the VGA or HDMI signal, and may consist of or comprise for example a digital camera, a medical imaging device, in short any device capable of providing a digital video output of a sequence of images. Output as a video stream is comprised within the scope of the present invention as video is some sort of sequence of images or image frames.

The operating system of the presenting device (1) is not relevant with regard to the implementation of the present invention, as no software needs to be installed on the presenting device for the implementation of the present invention.

The receiving device (4) may be a tablet, a portable computer, a smartphone, in general may be any electronic device capable of receiving and displaying the data as transmitted by the transmitting device (2).

The communication between the transmitting device (2) and the receiving device (4) takes place over a WI-FI network. To ensure an optimal connectivity the transmitting device (2) and the receiving device (4) need to be connected by means of an intermediary wireless system. This system preferably should support DHCP and minimally the 802.11 b/g network.

A plurality of intermediate transmitting stations can be used during the presentation, to ensure an optimal communication between the transmitting device (2) and the receiving device (4). This enhances the reliability of the wireless communication network.

Regarding the wireless communication between the transmitting device (2) and the receiving devices (4), preferably tablets, smartphones or PC's, use is made preferably of a protocol of "multicast" and of a wireless network, as for example a WI-FI network.

The "multicast" protocol ensures that a "1" to "n" communication is realized. This method ensures that many receiving devices (4) may receive identical image information without noticeable time delay.

The implementation is such that possible shortcomings of the multicast-protocol and taken care of such that a transfer of information according to state-of-the-art quality standards takes place and that the images on the receiving devices (4) are identical to the images that are delivered by the presenter to the transmitting device (2) over the HDMI-cable.

In the claims as set forth hereinafter, the word "comprising" does not exclude other elements or steps, and the indefinite article "a" or "an" does not exclude a plurality. The mere fact that certain measures are recited in mutually different dependent claims does not indicate that a combination of these measures can not be used to advantage.

The invention claimed is:

1. Method for displaying a sequence of images to listeners of a presentation, the method comprising:
   (a) a presenting device of a presenter of the presentation displaying images out of a sequence of still images in a presentation format and simultaneously transferring the displayed images to a transmitting device;
   (b) the transmitting device processing, storing and wirelessly transmitting the images to receiving devices of the listeners;
   (c) the receiving devices receiving the images from the transmitting device and displaying the images to the listeners;
   (i) the transmitting device transmitting the sequence of images in real time through a wireless multicast network, and upon transmittal of the last image displayed, a sequence of the previously displayed images is re-transmitted; and
   (ii) the receiving devices enabling selection by the listeners of one or more images from the sequence of images received by the receiving devices for storage on the receiving devices and for processing and enabling annotation by means of software loaded on the receiving devices as an application from the internet or from the transmitting device.

2. Method according to claim 1, wherein the re-transmittal of the sequence of the previously displayed images continues until the presenting device displays a new image.

3. Method according to claim 1, further comprising the receiving devices displaying the images in one of two formats:
   a full screen mode for displaying to the listener the most recent image displayed by the presenting device;
   a picture-in-picture mode, for enabling the processing or annotation by the listener of the most recent image displayed,
   wherein the receiving devices further display the sequence of the previously displayed images in smaller format at bottom portions of screens of the receiving devices.

4. Method according to claim 3 further comprising the receiving devices displaying the images in the picture-in-picture mode during processing or annotation of an image by a listener and then displaying the images in the full screen mode following the processing or annotation of the image by the listeners.

5. System for displaying a sequence of images to listeners of a presentation, the system comprising:
   (a) a presenting device of a presenter of the presentation suitable for displaying images out of a sequence of still images in a presentation format to the listeners and for transferring the displayed images;
   (b) a transmitting device suitable for receiving, storing and transmitting the sequence of images transferred by the presenting device;
   (c) receiving devices of the listeners suitable for receiving, storing and displaying the images transmitted by the transmitting device, the receiving devices comprising screens for displaying the images to the listeners;
   wherein (i) the transmitting device is suitable to transmit the sequence of images transferred from the presenting device in real time by means of a wireless multicast network, wherein upon transmittal of the last image displayed, a sequence of the previously displayed images is re-transmitted; and
   wherein (ii) the receiving devices comprise software loaded as an application from the internet or from the transmitting device, the application enabling the listeners to select images from the sequence of images received by the receiving devices for storage on the receiving devices and enabling annotation of the selected images.

6. System according to claim 5, wherein the transmitting device comprises encryption software for securing the images transmitted to the receiving device.

7. System according to claim 5, comprising authentication software enabling the listener to authenticate prior to receipt of the images displayed.

8. System according to claim 5, wherein the receiving device is suitable for storing by means of an internet-connection the images selected by the listener with annotations in a private storage folder of the listener in the cloud.

9. System according to claim 5, wherein the receiving device is a mobile data-processing apparatus, for example a laptop, a tablet, a smartphone.

10. System according to claim 5, wherein the sequence of images is transferred by digital means from the presenting device to the transmitting device.

11. System according to claim 10, wherein the transmitting device is suitable to transmit the images to a projection device and/or via a multicast wireless transmitting module.

12. System according to claim 5, wherein the sequence of images comprises a continuous or discrete stream of still and/or moving images in a presentation format.

13. System according to claim 12, wherein the images are supplemented with audio data.

* * * * *